UNITED STATES PATENT OFFICE.

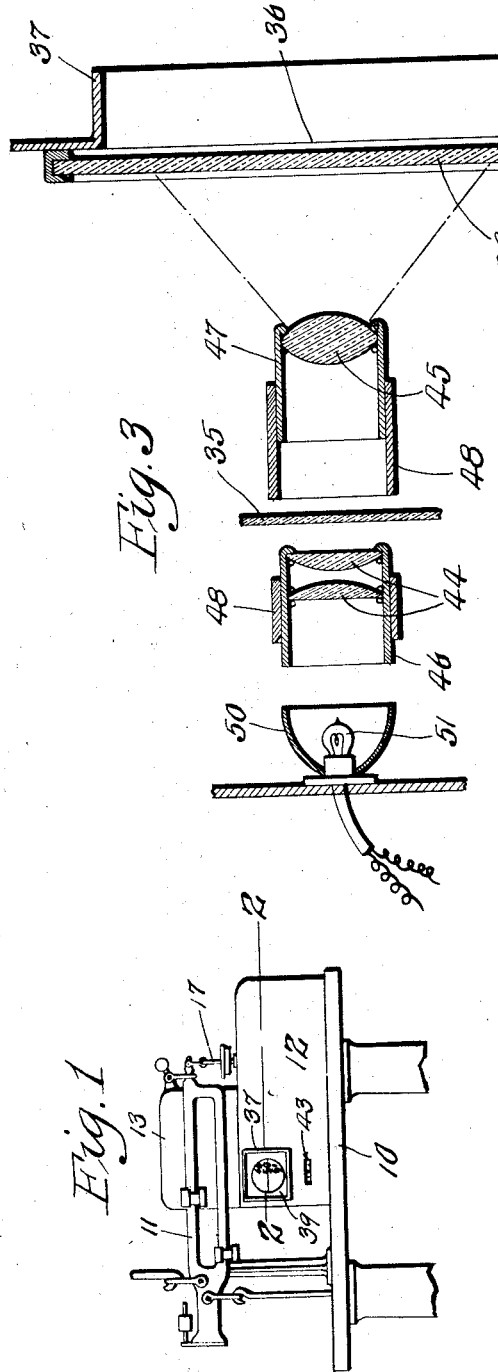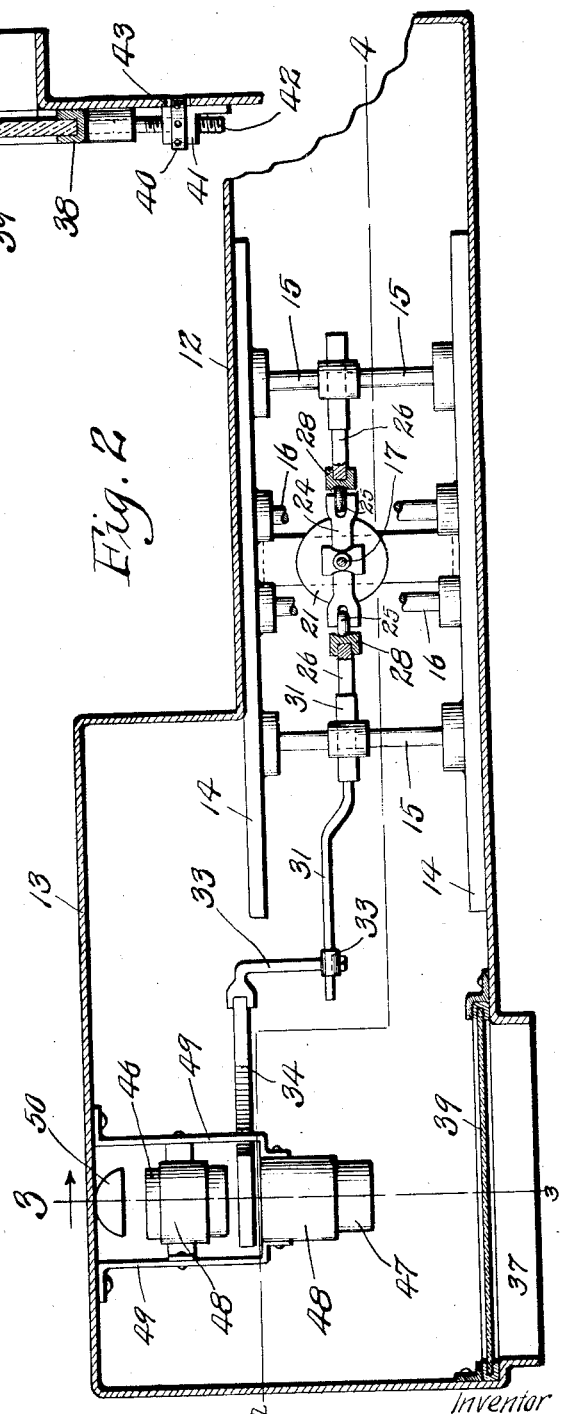

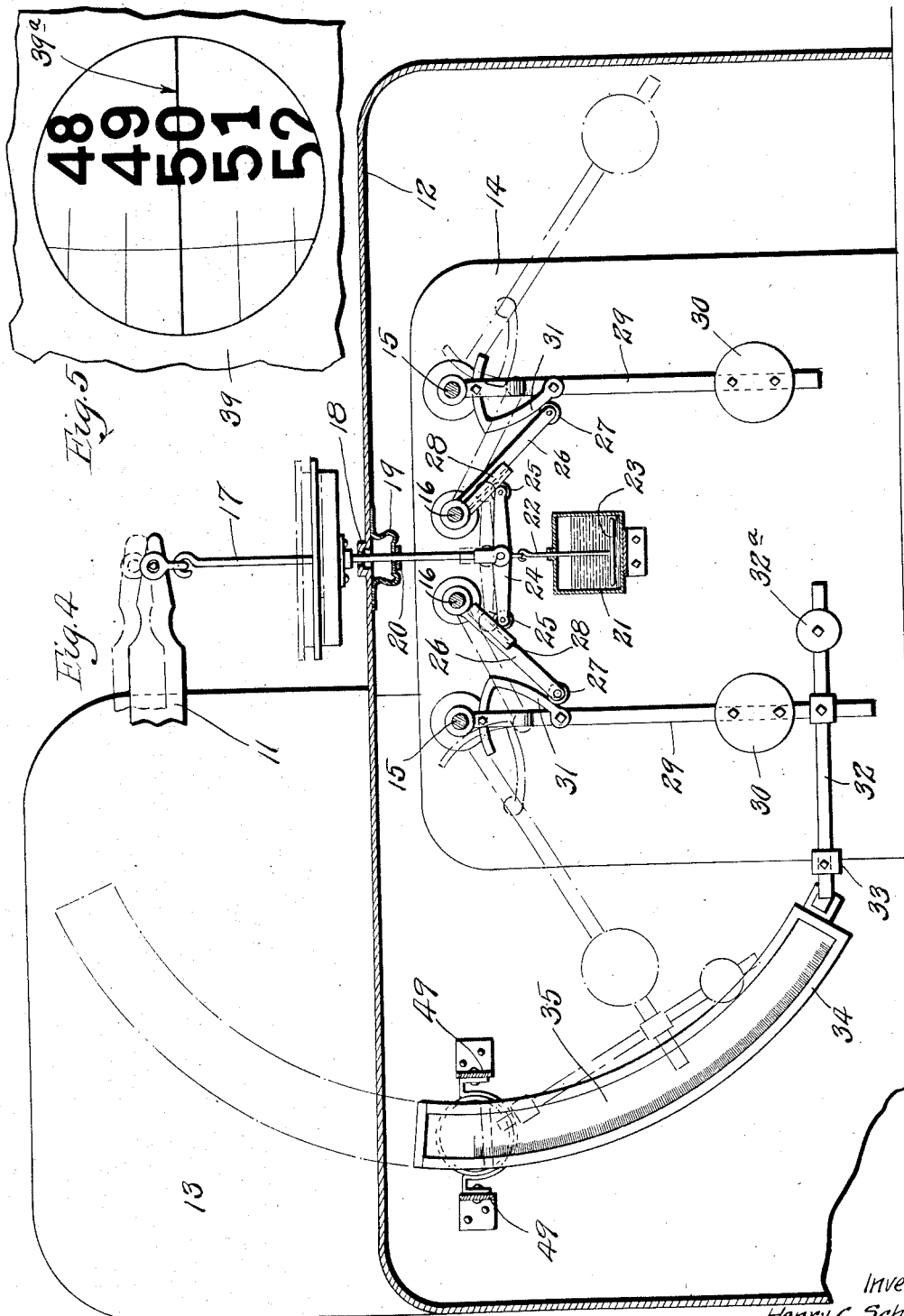

HENRY C. SHAPER, OF ST. LOUIS, MISSOURI, ASSIGNOR TO THE GENERAL AUTOMATIC SCALE COMPANY, OF ST. LOUIS, MISSOURI, A CORPORATION OF MISSOURI.

WEIGHT-INDICATOR FOR SCALES.

1,385,718.        Specification of Letters Patent.     Patented July 26, 1921.

Application filed November 4, 1916. Serial No. 129,604.

*To all whom it may concern:*

Be it known that I, HENRY C. SCHAPER, a citizen of the United States, residing at St. Louis, Missouri, have invented a certain new and useful Improvement in Weight-Indicators for Scales, of which the following is a full, clear, and exact description, such as will enable others skilled in the art to which it appertains to make and use the same, reference being had to the accompanying drawings, forming part of this specification.

My invention relates generally to beam scales and more particularly to an automatically operating weight indicating mechanism which is directly connected to and operated by the scale beam, the principal object of my invention being to provide a comparatively simple mechanism including a projecting apparatus for displaying on a ground glass or screen, enlarged weight indicating numerals, thereby making it possible for the weighman to easily and quickly read the weight of the loads placed on the scales, said apparatus being very compact and adaptable for use in connection with practically all types of beam scales.

Practically all the automatic indicators for scales now in general use include dials which by reason of the large number of graduated scale marks necessarily required, are comparatively large in size and it is one of the objects of my invention to utilize in a weight indicator for scales a comparatively small transparent member, the same bearing a graduated scale, and further to provide projecting means including a source of light and a series of lenses by means of which the graduated marks and numerals are projected onto a screen or ground glass in enlarged form so that they may be instantly and readily observed by the person in charge of the scales.

With the foregoing and other objects in view, my invention consists in certain novel features of construction and arrangement of parts, hereinafter more fully described, claimed, and illustrated in the accompanying drawings, in which—

Figure 1 is a front elevational view of a beam scale, the same being provided with an automatic weight indicator of my improved construction.

Fig. 2 is an enlarged horizontal section taken approximately on the line 2—2 of Fig. 1.

Fig. 3 is an enlarged cross sectional view taken approximately on the line 3—3 of Fig. 2.

Fig. 4 is a vertical section taken approximately on the line 4—4 of Fig. 2.

Fig. 5 is an elevational view of a portion of a ground glass or screen upon which the weight indicating numerals and graduated lines are projected by my improved apparatus.

In the drawings which illustrate a practical embodiment of my invention, 10 designates the table of an ordinary beam scale and 11 the beam thereof and positioned on said table preferably below and to the rear of the beam is a suitable housing 12, preferably dust proof, the same containing the operating parts of my improved indicating mechanism.

The left hand portion of the housing 12 is provided with a rearward extension 13, the same being substantially twice the height of the housing 12 and extending upwardly to the rear of beam 11. Located within housing 12 is a pair of vertically disposed plates 14, the same being provided with suitable bearings for the pairs of transversely disposed shafts 15 and 16. The members of the pair of shafts 16 are located comparatively close together and the shafts 15 are located to the sides of said shafts 16.

Connected to the scale beam 11 is a vertically disposed rod 17, the same extending downward into the housing 10 between the pair of shafts 16. A suitable bearing 18 is formed in the top of housing 12 and fixed to the underside of the top of the housing beneath said bearing is the edge of a flexible disk 19, the central portion of which is fixed to a disk or plate 20 that is carried by rod 17. This flexible disk permits the rod 17 to move freely with the scale beam 11, and at the same time prevents dust and the like from entering the housing 12 through bearing 18.

Located directly beneath the rod 17 is a dash pot 21 which is partially filled with a comparatively heavy liquid and connected to the lower end of said rod is a depending rod 22 which extends down into the dash pot and carries a disk or plate 23, the same being normally submerged in the heavy liquid.

Carried by the lower end of rod 17 is a cross bar 24, the outer ends of which are provided with anti-friction rollers 25. Positioned on shafts 16 are the upper ends of inclined levers 26, the lower ends of which are provided with anti-friction rollers 27. Located on the upper portions of these levers 26 and on the undersides thereof are wear plates 28, preferably of hardened metal and against which the anti-friction rollers 25 normally engage. Connected to and depending from the shafts 15 are arms or rods 29 upon the lower portions of which are adjustably mounted pendulum weights 30.

Carried by the upper portions of the arms or rods 29 and projecting inwardly toward the shafts 16 are bearing members 31, the same being preferably curved and against which the anti-friction rollers 27 normally engage. Arranged for vertical adjustment upon the lower portion of the left hand one of the arms or rods 29 is a horizontally disposed arm 32, the right hand end of which carries an adjustable counterbalancing weight 32$^a$ and mounted for adjustment upon the left hand end of this arm is a comparatively short rearwardly projecting arm 33. Rigidly fixed to the rear end of this arm 33 is the lower end of an arcuate frame 34 in which is positioned a section 35 of glass, celluloid or other transparent material, the same bearing on one of its faces an arcuate scale, the graduated marks and numerals of which are comparatively small.

It will be understood that the capacity or range of the graduated scale appearing on the transparent member 35 corresponds to the capacity or range of the scale to which the apparatus is applied.

The frame 34 and the transparent member 35 carried thereby are formed so as to occupy a position concentric to the axis of the left hand one of the shafts 15 and the zero mark of the graduated scale upon member 35 is located at a point near the upper end of said transparent member.

Formed in the front wall of housing 12 is an opening 36 around which is arranged an outwardly projecting frame 37. Positioned within the housing 12 immediately behind this opening 36 is a frame 38 which carries a section of translucent material 39, preferably ground glass. Arranged on the face of the ground glass and near the center thereof is a comparatively heavy horizontally disposed black line 39$^a$.

Projecting downward from the central portion of frame 38 through a nut 40 which is rotatably held between a pair of fixed brackets 41 is a threaded shaft 42. An opening 43 which is formed in the front wall of housing 12 permits access to the nut 40 and as the same is rotated, shaft 42 is moved vertically, thereby imparting corresponding movement to frame 38 and ground glass 39. This vertical adjustment of the ground glass is necessary in order to bring the mark 39$^a$ on the surface thereof into proper horizontal position with respect to the center of the lenses utilized in the projecting apparatus of my improved device.

The projecting apparatus contemplated by my invention includes a pair of associated convex condensing lenses 44 and a double convex projecting lens 45, said lenses being located respectively in barrels or tubular holders 46 and 47, and said holders being mounted for adjustment toward and away from each other in brackets 48, the latter being connected to supports 49 which project inwardly from the rear wall of housing 13. The supports 49 are arranged so that the lens holders 46 and 47 are located in alinement with the upper portion of transparent member 35 and the latter during operation moves upwardly between the pair of condensing lenses 44 and projecting lens 45.

Located on the rear wall of housing 13 and in horizontal alinement with the lenses is a reflector 50 in which is arranged a suitable source of light, preferably an electric lamp 5.

Under normal conditions or while the parts of my improved indicator are at rest, said parts occupy the positions illustrated in solid lines in Fig. 4, with the zero mark of the graduated scale on transparent member 35 in alinement with the centers of the lenses 44 and 45. To insure accuracy in operation, ground glass 39 should be adjusted vertically by proper manipulation of nut 40 so that the horizontal line 39$^a$ on said ground glass is in register with the zero mark on the graduated scale of member 35.

When lamp 51 is lighted, the rays therefrom will be directed forwardly through condensing lenses 44, thence through transparent member 35, thence through lens 45 and as the latter is of the wide angle variety, the lines of demarcation and numerals forming the graduated scale on member 35 will be greatly enlarged when thrown onto ground glass 39.

A load to be weighed is placed on the platform of the scale with the result that the outer end of beam 11 will move upward, consequently pulling rod 17 and cross arm 24 upward. This movement causes antifriction rollers 25 to bear against the hardened metal wear plates 28, with the result that the lower ends of levers 26 and the anti-friction rollers 27 thereon will be swung outwardly and upwardly, and said rollers 27 bearing against members 31 will cause the lower ends of the pendulum weighted arms 29 to swing outwardly and upwardly. This operation moves transparent member 35 upward between the condensing lenses 44 and lens 45, and when such movement stops, the numbered mark on the graduated scale carried by transparent member 35 which is in direct alinement with the centers of the lenses will be projected in greatly enlarged form onto the ground glass 36, and in such enlarged form it can be easily noted by the weighman or person operating the scale. As soon as the load is removed from the platform of the scale, the outer end of scale beam 11 will move downward with the result that the various operating parts of the mechanism comprising my improved indicator will return to their normal positions.

The pendulum weights 30 tend to cause the various parts of the operating mechanism to act with regular or steady movement, and the dash pot tends to absorb all vibration of the moving parts during operation. Further the pendulum weights serve to yieldingly resist the upward movement of the end of the scale beam and the movements of the operating parts of the device between the scale beam and the arms 29. The weight 32$^a$ serves as a counterbalance for the frame 34 and transparent member 35 and coöperates with the pendulum weights 30 in returning the various parts to their normal positions after having been actuated as hereinbefore described.

In the event that any part of my improved indicating mechanism becomes inoperative, the weighing scale and its beam may be operated in the usual manner by placing the regular counter-balancing weights upon the usual support which is in the form of a disk carried by rod 17.

By projecting the marks and numbers of the graduated scale in enlarged form onto a ground glass or screen, much greater accuracy can be obtained than where the marks and numbers of a scale are read through a magnifying glass, for necessarily the latter is located a short distance away from the scale and numbers and unless the person operating the scales is in a position to look on a straight line directly through the center of the magnifying glass, an accurate reading of the graduated scale cannot be obtained.

I do not in this application claim a single pendulum arm weighted within the housing, which arm carries the transparent member containing the graduated scale, as the same is claimed in a companion application filed by me December 17, 1917, Serial No. 207,683.

An automatic scale indicator of my improved construction is comparatively simple, is very compact, can be readily combined with practically all types of beam scales now in general use, is accurate in operation and instantly displays in comparatively large form the number corresponding to the weight of the load placed on the scale platform.

It will be readily understood that minor changes in the size, form and construction of the various parts of my improved automatic scale can be made and substituted for those herein shown and described, without departing from the spirit of my invention, the scope of which is set forth in the appended claims.

I claim:

1. The combination in a weighing scale having a beam, of a member depending from the free end of the beam, a pair of pivotally mounted levers adapted to be actuated by said depending member, pendulum weighted arms adapted to be actuated by said levers, a transparent member provided with a graduated scale, which member is carried by one of the pendulum weighted arms, and means for projecting the marks of the graduated scale onto a screen in enlarged form.

2. The combination in a weighing scale having a beam, of a member depending from the free end of the beam, a pair of pivotally mounted levers adapted to be actuated by said depending member, pendulum weighted arms adapted to be actuated by said levers, a transparent member provided with a graduated scale, which member is carried by one of the pendulum weighted arms, means for projecting the marks of the graduated scale onto a screen in enlarged form, and a vibration arrester associated with said depending member.

3. The combination in a weighing scale having a beam, of a member depending from the free end of the beam, a cross arm on said member, a pair of levers which are engaged and adapted to be actuated by said cross arm, a pair of pendulum weighted arms, parts of which are engaged and adapted to be actuated by the levers, a transparent member carried by one of the pendulum weighted arms, and movable therewith, said member being provided with a graduated scale, and means for projecting the marks of the graduated scale onto a screen in enlarged form.

4. The combination with a movable part of a scale, of a substantially transparent member provided with a graduated scale, means including a pendulum for multiplying the movement of the movable part of the scale and transmitting the multiplied movement to the substantially transparent member, a housing for said transparent member and the movement multiplying and transmitting means, a screen on said housing, and means for projecting the marks of the graduated scale onto said screen.

In testimony whereof I hereunto affix my signature in the presence of two witnesses, this 2nd day of November, 1916.

HENRY C. SCHAPER.

Witnesses:
M. P. SMITH,
M. A. HANDEL.